Dec. 21, 1937.  C. A. LOVELAND  2,103,114
MILKING STOOL
Filed July 3, 1936  2 Sheets—Sheet 1
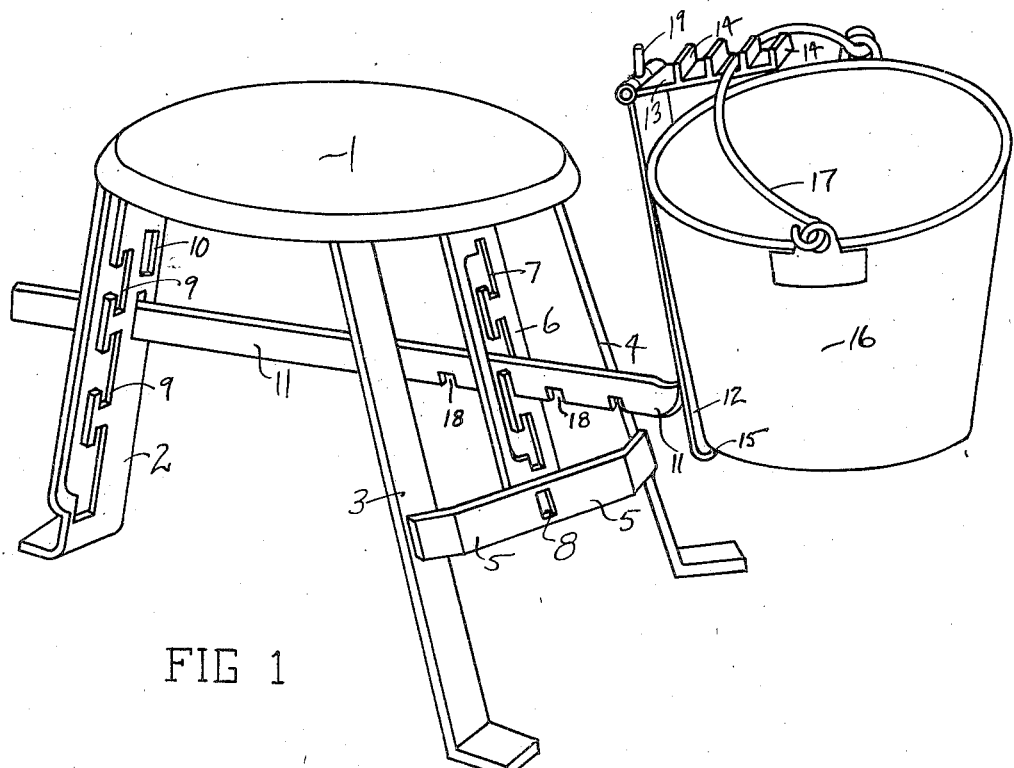
FIG 1
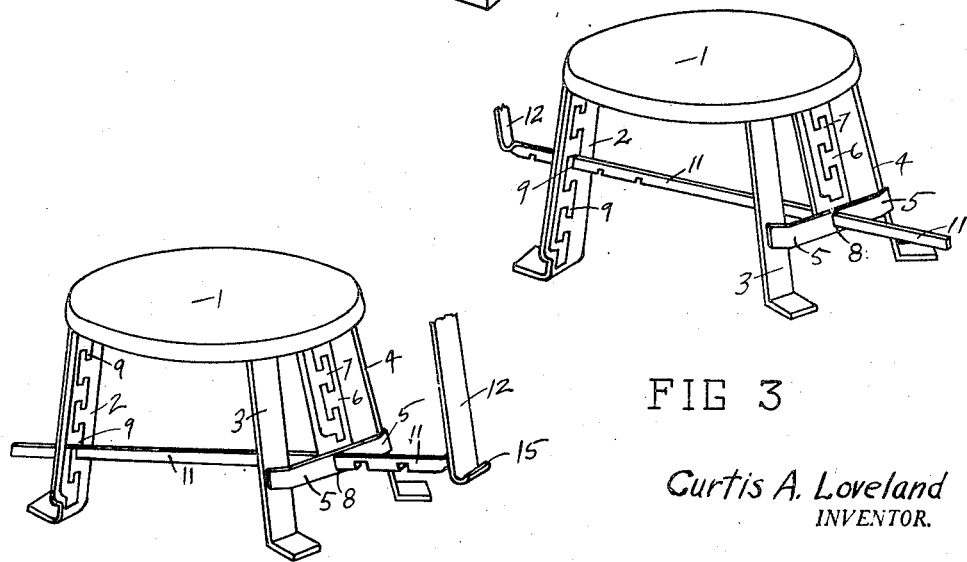
FIG 2
FIG 3
Curtis A. Loveland
INVENTOR.
BY W. B. Harpman
ATTORNEY.

Dec. 21, 1937.  C. A. LOVELAND  2,103,114
MILKING STOOL
Filed July 3, 1936  2 Sheets-Sheet 2

Curtis A. Loveland
INVENTOR.

BY W.B.Harpman
ATTORNEY.

Patented Dec. 21, 1937

2,103,114

UNITED STATES PATENT OFFICE 2,103,114

MILKING STOOL

Curtis A. Loveland, Youngstown, Ohio

Application July 3, 1936, Serial No. 88,760

7 Claims. (Cl. 31—57)

This invention relates to milking stools.

In general, this invention is an improvement over that disclosed in my co-pending application for Milking stool, Ser. No. 45,885, filed Oct. 21, 1935, now Patent Number 2,054,262, dated September 15, 1936.

The principal object of this invention is to provide a milking stool having a pail support thereon which may be adjusted to many various positions.

A further object of this invention is to provide a pail support member that will securely hold against inadvertent tilting or spilling.

A still further object of this invention is to provide a pail support member from which a pail may be readily disengaged at any time without further adjustment.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a side elevation of the device supporting a pail in an adjusted position.

Figure 2 is a partial view of the device showing the milking stool and the adjusting member in a different position.

Figure 3 is a partial view of the device showing the milking stool and the adjusting member in a reversed position.

Figure 4:
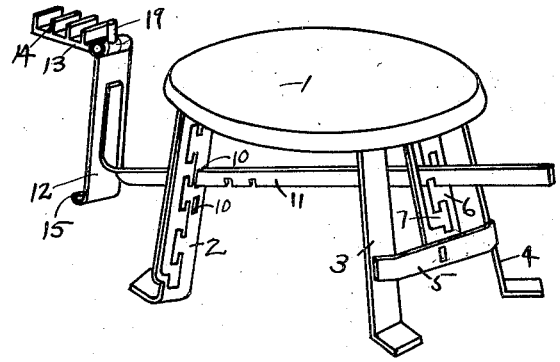
Figure 4 is a partial view of the device showing the milking stool and the adjusting member in a different reversed position.

By referring to Figure 1 it will be seen that the device comprises a seat 1 provided with legs 2, 3, and 4. The legs 3 and 4 are provided with a brace 5 and have positioned between them a vertical bar 6 which is provided with a plurality of notches 7. An opening 8 is formed within the brace 5. The leg 2 of the device is provided with a plurality of notches 9 and a plurality of openings 10. An adjustment bar 11 having notches 18 is shown positioned in an opening 10 and in one of the notches 7. In this position the device is adjusted from the front. The adjustment bar 11 has an upright portion 12 which is provided at its upper end with a hinged support bracket 13 having a plurality of catches 14 formed thereon, and at its lower end with an upturned portion 15. The hinged support bracket 13 is also provided with a rest 19 to prevent it from falling backward. A pail 16 having a handle 17 is shown positioned on this upright portion 12 of the adjustment bar 11 with its handle 17 held by one of the catches 14.

By referring to Figure 2 it will be seen that the adjustment bar 11 is positioned in the opening 8 of the brace 5 and in one of the notches 9 of the leg 2, and in this position is adjusted from the back.

By referring to Figure 3 it will be seen that the adjustment bar 11 has been reversed and is positioned in the opening 8 of the brace 5 and in one of the plurality of notches 9 in the leg 2, and in this position is adjusted from the front as the leg 2 now becomes the front leg of the device.

By referring to Figure 4 it will be seen that the adjustment bar 11 is positioned in one of the openings 10 in the leg 2 and in one of the notches 7 of the vertical bar 6. In this position the device is adjusted from the rear, the leg 2 still being the front of the device.

Figure 5:
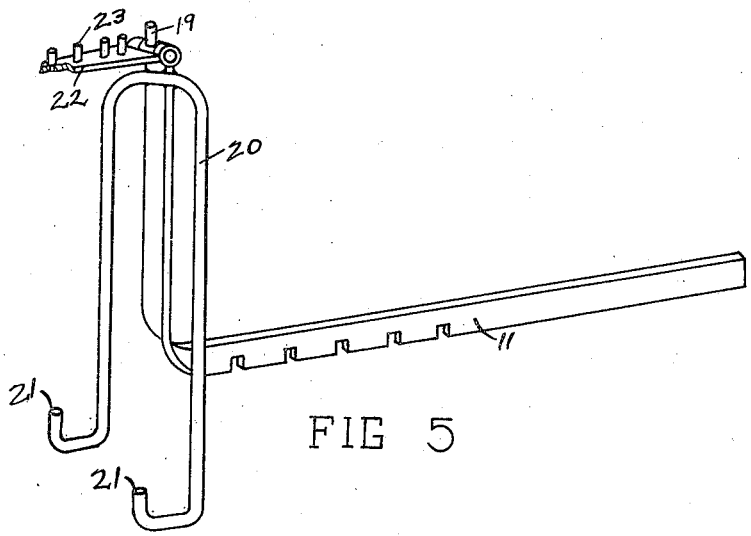
Figure 5 is a perspective view of a modification of the adjusting member of the device.

By referring to Figure 5 it will be seen that there is provided a modification in that the upright portion of the adjustment bar is not provided with an upturned end but has instead an inverted U-shaped support member 20 having upturned ends 21. The hinged portion 22 for receiving the handle of a pail is also different in that it has a plurality of studs 23 instead of the catches.

In using this device the pail support means is readily adjustable in any one of the four positions shown in the drawings. In Figures 1 and 2 the legs 3 and 4 are the front legs and the adjustment may be made from either the front or the rear. In Figures 3 and 4 the leg 2 becomes the front leg and the pail support means may be adjusted from either the front or the rear.

It is obvious that the modification shown in Figure 5 also may be used in all of the various operating positions.

It is obvious that the stool may be assembled by welding the various parts together or by any other means.

What I claim is:—

1. In a milking stool comprising a seat member, three legs supporting said seat member, a brace and a vertical bar positioned between two of said legs, said vertical bar having a plurality of notches therein, and the remaining one of said legs being provided with a plurality of openings, a notched adjustment bar slidably maintained through one of the said notches and one of said openings, an upright member attached to one end of said adjustment bar, a member hingedly attached to the upper end of said upright member and having a plurality of catches formed thereon and adapted to receive the bail of a pail, and an upturned end formed on the lower end of said upright member for receiving and holding the bottom of the said pail in position.

2. In a milking stool comprising a seat member, three legs supporting said seat member, a brace positioned between two of said legs and having an opening therein, and the remaining one of said legs being provided with a plurality of notches, a notched adjustment bar slidably maintained through one of said notches and through said opening, an upright member attached to one end of said adjustment bar, a member hingedly attached to the upper end of said upright member and having a plurality of catches formed thereon and adapted to receive the bail of a pail, and an upturned end formed on the lower end of said upright member for receiving and holding the bottom of the said pail in position.

3. In a milking stool comprising a seat member, three legs supporting said seat member, a brace and vertical bar positioned between two of said legs, said brace having an opening and said vertical bar having a plurality of notches formed therein, said remaining leg being provided with a plurality of openings and a plurality of notches, a notched adjustment bar adapted to be slidably maintained within any of said openings and within any of said notches, an upright member attached to one end of said adjustment bar, a member hingedly attached to the upper end of said upright member and having a plurality of catches formed thereon and adapted to receive the bail of a pail, and an upturned end formed on the lower end of said upright member for receiving and holding the bottom of the said pail in position.

4. In a milking stool comprising a seat member, three legs supporting said seat member, a brace and vertical bar positioned between two of said legs, said brace having an opening and said vertical bar having a plurality of notches formed therein, said remaining leg being provided with a plurality of openings and a plurality of notches, a notched adjustment bar adapted to be slidably maintained within any of said openings and within any of said notches, an upright member attached to one end of said adjustment bar, a member hingedly attached to the upper end of said upright member and having a plurality of studs thereon and adapted to receive the bail of a pail, an inverted U-shaped support member attached to said upright member and upturned ends on said inverted U-shaped support member for receiving and holding the bottom of said pail in position.

5. In a milking stool comprising a seat member, three legs supporting said seat member, a brace and a vertical bar positioned between two of said legs, said vertical bar having a plurality of notches therein, and said remaining leg being provided with a plurality of openings, a notched adjustment bar slidably maintained through one of said notches and one of said openings, an upright member formed on one end of said adjustment bar, a member hingedly attached to the upper end of said upright member and having a plurality of studs thereon adapted to receive the bail of a pail, an inverted U-shaped support member attached to said upright member and upturned ends on said inverted U-shaped support member for receiving and holding the bottom of the said pail in position.

6. In a milking stool comprising a seat member, three legs supporting said seat member, a brace positioned between two of said legs and having an opening therein, and said remaining leg being provided with a plurality of notches, a notched adjustment bar slidably maintained through one of said notches and through said opening, an upright member formed on one end of said adjustment bar, a member hingedly attaced to the upper end of said upright member and having a plurality of studs thereon adapted to receive and hold the bail of a pail, an inverted U-shaped support member attached to said upright member and upturned ends on said inverted U-shaped support member for receiving and holding the bottom of said pail in position.

7. In a milking stool comprising a seat member, three legs supporting said seat member, a brace and a vertical bar positioned between two of said legs, said vertical bar having a plurality of notches therein, and the remaining one of said legs being provided with a plurality of openings, a notched adjustment bar slidably maintained through one of said notches and one of said openings, one end of said adjustment bar being so formed as to receive and hold a pail in an upright position.

CURTIS A. LOVELAND.